(12) United States Patent
Mulligan

(10) Patent No.: US 9,090,296 B2
(45) Date of Patent: Jul. 28, 2015

(54) RESILIENT TRACK FRAME PIVOT MECHANISM

(71) Applicant: Deere & Company, Moline, IL (US)

(72) Inventor: Patrick J. Mulligan, Dubuque, IA (US)

(73) Assignee: Deere & Company, Molin, IL (US)

( * ) Notice: Subject to any disclaimer, the term of this patent is extended or adjusted under 35 U.S.C. 154(b) by 135 days.

(21) Appl. No.: 14/013,092

(22) Filed: Aug. 29, 2013

(65) Prior Publication Data

US 2015/0060157 A1 Mar. 5, 2015

(51) Int. Cl.
*B62D 55/084* (2006.01)
*F16C 11/04* (2006.01)
*B62D 55/104* (2006.01)

(52) U.S. Cl.
CPC ............ *B62D 55/084* (2013.01); *B62D 55/104* (2013.01); *F16C 11/04* (2013.01)

(58) Field of Classification Search
CPC .................................................. B62D 55/1086
See application file for complete search history.

(56) References Cited

U.S. PATENT DOCUMENTS

| 4,067,524 | A | * | 1/1978 | Brinkmann | 248/544 |
| 4,230,378 | A | * | 10/1980 | Purcell et al. | 305/125 |
| 4,232,754 | A | * | 11/1980 | Corrigan et al. | 180/9.5 |
| 4,844,195 | A | * | 7/1989 | Deli et al. | 180/9.5 |
| 4,946,188 | A | * | 8/1990 | Key et al. | 280/86.752 |
| 4,951,959 | A | * | 8/1990 | Watanabe et al. | 280/124.136 |
| 5,368,115 | A | * | 11/1994 | Crabb | 180/9.1 |
| 7,014,278 | B2 | * | 3/2006 | Yoshida et al. | 305/132 |
| 7,231,993 | B2 | * | 6/2007 | Albright et al. | 180/9.5 |
| 2012/0279416 | A1 | * | 11/2012 | Nishimura et al. | 105/218.1 |
| 2013/0043719 | A1 | | 2/2013 | Wietharn et al. | |
| 2014/0137765 | A1 | * | 5/2014 | Nishimura et al. | 105/182.1 |

* cited by examiner

*Primary Examiner* — Kevin Hurley

(74) *Attorney, Agent, or Firm* — Taft Stettinius & Hollister LLP; Stephen F. Rost

(57) ABSTRACT

The present disclosure provides a pivot joint about which a track frame pivots relative to a main frame of a work machine. The pivot joint includes a housing having a first cover portion, a second cover portion, and at least one load-bearing rib. The pivot joint also includes a holder configured to be coupled to the main frame and includes a first leg and a second leg. An upper body and a lower body are coupled to one another and are adapted to be coupled to the track frame. The pivot joint further includes a plurality of plates stacked on top of one another. The plurality of plates is positioned between the first leg and second leg of the holder and between the upper body and lower body. The plurality of plates defines a pivot axis of the pivot joint.

19 Claims, 8 Drawing Sheets

RESILIENT TRACK FRAME PIVOT MECHANISM

FIELD OF THE DISCLOSURE

The present disclosure relates to a frame of a machine, and in particular to a pivot mechanism of a track frame of the machine.

BACKGROUND

Work machines, particularly in the construction and forestry industries, can be designed with different frames for support. In some instances, there can be an upper frame and a lower frame, or undercarriage, for supporting the machine. Many of these frames can have different joints that allow the work machine to perform different tasks. The different joints can be lubricated to facilitate smooth rotational or pivotal movement thereabout. In some instances, however, the lubrication of the joint requires sufficient sealing to prevent leakage and the like. Bushings, bearings, and other supporting hardware can wear and this can add cost to the machine.

SUMMARY

In one embodiment of the present disclosure, a pivot joint is provided about which a track frame pivots relative to a main frame of a crawler. The pivot joint includes a housing configured to be coupled to the main frame, the housing including a first cover portion, a second cover portion, and at least one load-bearing rib configured to be coupled to the main frame; a holder configured to be coupled to the main frame, the holder including a first leg and a second leg; an upper body and a lower body coupled to one another, the upper body and lower body adapted to be coupled to the track frame; and a plurality of plates stacked on top of one another, the plurality of plates being positioned between the first leg and second leg of the holder and between the upper body and lower body; wherein, the plurality of plates defines a pivot axis of the pivot joint.

In one example of this embodiment, the first leg and second leg each define a slot in which the plurality of plates is disposed. In a second example, the arrangement of the plurality of plates forms a defined thickness and a pivot axis is defined at approximately a center of the thickness. In a third example, the first cover portion is coupled to the holder and the second cover portion is removably coupled to the holder. In a fourth example, a bottom side of the upper body includes a first curved surface, a second curved surface, and a substantially flat surface therebetween; a top side of the lower body includes a first curved surface, a second curved surface, and a substantially flat surface therebetween, where both of the substantially flat surfaces are oriented towards one another; further wherein, during a pivotal movement about the pivot joint, the upper and lower bodies pivot relative to the plurality of plates such that the plurality of plates come into contact with the first curved surface, second curved surface, and substantially flat surface of both the upper body and lower body.

In a fifth example of this embodiment, the upper body includes a first portion having a first thickness, a second portion having a second thickness, and a third portion have a third thickness, the first and third thicknesses are about the same and the second thickness is less than the first and third thicknesses; further wherein, the second portion is positioned between the first and third portions. In a sixth example, a key is disposed within the second portion of the upper body, the key being coupled to the upper body, lower body, and the plurality of plates. In a seventh example, the plurality of plates includes at least one rubber plate.

In another embodiment, a machine includes a main frame configured to support the machine; a track frame coupled to the main frame; a ground-engaging mechanism supported by the track frame; and a pivot joint defining a pivot axis about which the track frame pivots, the pivot joint including a plurality of plates each of which is arranged on top of one another, wherein the plurality of plates includes at least one rubber plate; wherein, during a pivotal movement, the track frame pivots relative to the plurality of plates.

In one example of this embodiment, the plurality of plates includes a plurality of metal plates and a plurality of rubber plates, wherein at least one of the plurality of rubber plates is positioned in contact with at least one of the plurality of metal plates. In a second example, a holder coupled to the main frame, the holder including a first leg and a second leg; wherein, the first leg and second leg each define a slot in which the plurality of plates are disposed. In a third example, a housing coupled to the main frame, the housing including a first cover portion coupled to the main frame and holder, a second cover portion removably coupled to the holder, and at least one load-bearing rib coupled to the main frame. In a fourth example, the first cover portion and second cover portion at least partially enclose the plurality of plates in the coupled position.

In a fifth example, an upper body and a lower body coupled to one another and the track frame, wherein the plurality of plates are positioned therebetween. In a sixth example, the upper body includes a first portion having a first thickness and a second portion having a second thickness, the first thickness being greater than the second thickness. In a seventh example, a key disposed within the second portion of the upper body, the key being coupled to the upper body, lower body, and the plurality of plates.

In another example, a bottom side of the upper body includes a first curved surface, a second curved surface, and a substantially flat surface therebetween; a top side of the lower body includes a first curved surface, a second curved surface, and a substantially flat surface therebetween, where both of the substantially flat surfaces are oriented towards one another; further wherein, as the track frame pivots about the pivot axis, the upper and lower bodies pivot relative to the plurality of plates such that the plurality of plates come into contact with the first curved surface, second curved surface, and substantially flat surface of both the upper body and lower body. In a different example, the track frame is structured to pivot no more than about 10° relative to the main frame.

In a different embodiment, a work machine includes a cab; a first frame to support the cab; a second frame coupled to the first frame; a ground-engaging mechanism supported by the second frame; and a pivot joint defining a pivot axis about which the second frame pivots relative to the first frame. The pivot joint includes a housing configured to be coupled to the first frame, the housing including a first cover portion, a second cover portion, and at least one load-bearing rib coupled to the first frame; a holder coupled to the first frame, the holder including a first leg and a second leg; an upper body and a lower body coupled to one another, the upper body and lower body further coupled to the second frame; and a plurality of plates stacked on top of one another, the plurality of plates being positioned between the first leg and second leg of the holder and between the upper body and lower body; further wherein, during a pivotal movement, the second frame pivots relative to the plurality of plates.

In one example of this embodiment, a bottom side of the upper body includes a first curved surface, a second curved surface, and a substantially flat surface therebetween; and a top side of the lower body includes a first curved surface, a second curved surface, and a substantially flat surface therebetween, where both of the substantially flat surfaces are oriented towards one another; further wherein, as the second frame pivots about the pivot axis, the upper and lower bodies pivot relative to the plurality of plates such that the plurality of plates come into contact with the first curved surface, second curved surface, and substantially flat surface of both the upper body and lower body.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
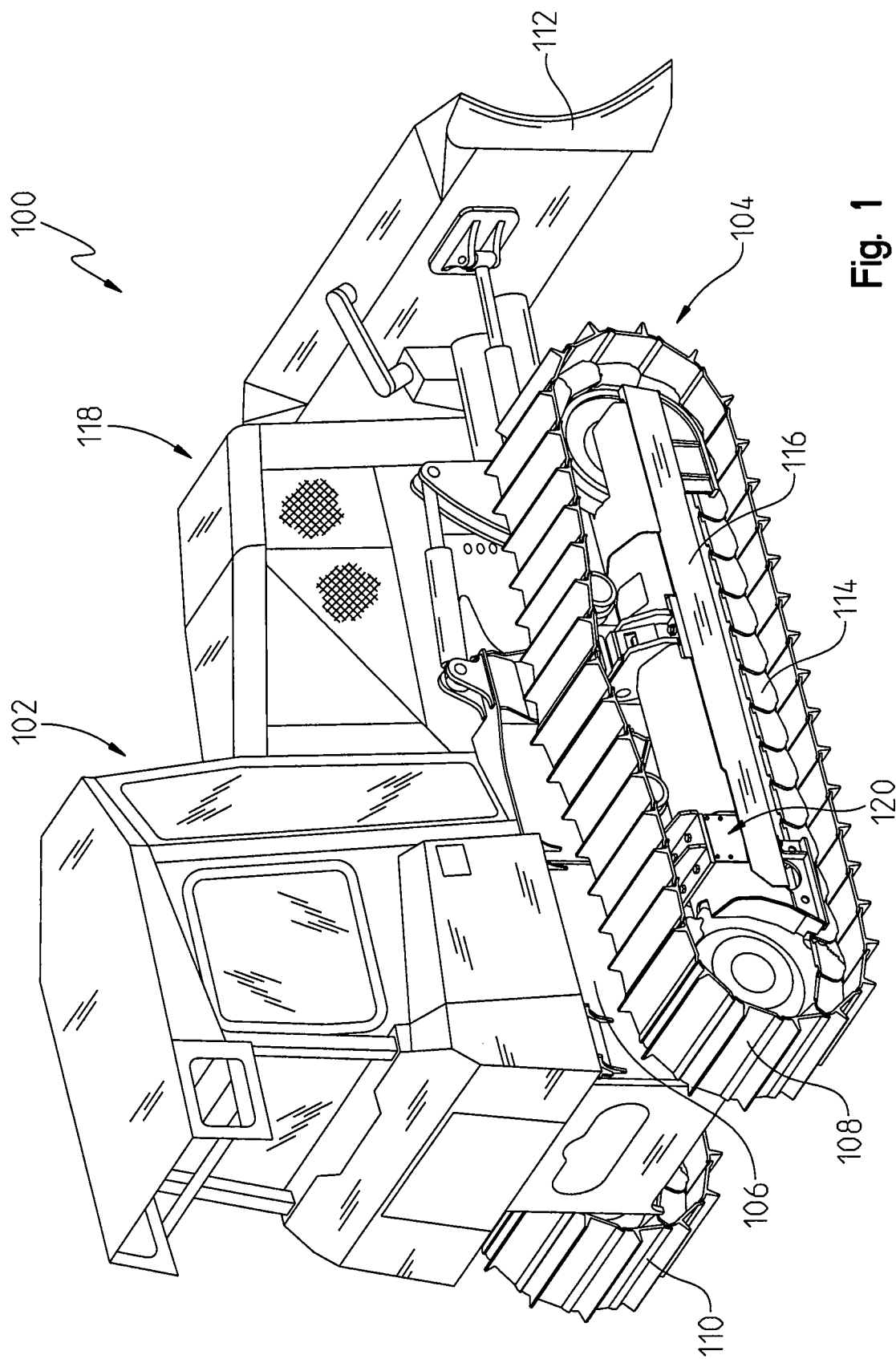
FIG. 1 is a side perspective view of a crawler.

An exemplary embodiment of a work machine is shown in FIG. 1. The machine is embodied as a crawler 100. The present disclosure is not limited, however, to a crawler and may extend to other work machines that perform desired operations. As such, while the figures and forthcoming description may relate to a crawler, it is to be understood that the scope of the present disclosure extends beyond a crawler and, where applicable, the term "machine" or "work machine" will be used instead. The term "machine" or "work machine" is intended to be broader and encompass other vehicles besides a crawler for purposes of this disclosure.

Referring to FIG. 1, the crawler 100 includes a cab 102 pivotally that is coupled to a main frame 106 of the machine. The cab 102 can include controls such as a steering wheel, buttons, levers, joysticks, foot pedals, and the like for controlling the crawler 100. Besides the main frame 106, the crawler 100 can further include an undercarriage 102. The undercarriage 102 can support one or more ground-engaging mechanisms 108. In FIG. 1, a first ground-engaging mechanism 108 and a second ground-engaging mechanism 110 are shown. The one or more ground-engaging mechanisms 108 can include a track, wheel, or other known mechanism. For purposes of this disclosure, reference will be made to a track rather than the other types of ground-engaging mechanisms. This is particularly true in the illustrated embodiments of FIGS. 1 and 2. Nevertheless, the present disclosure is not intended to be limited to a track and may include other known ground-engaging mechanisms.

Each ground-engaging mechanism 108, 110 in FIG. 1 can include a chain 114 driven by a final drive assembly (not shown) to move the crawler 100. The final drive assembly can be driven by a motor or other power mechanism. An engine or other power device 118 can provide the overall power for the crawler 100. As also shown, the crawler 100 can include a tool implement 112 such as a blade for performing a desired task. The tool implement 112 can be controlled by an operator via one of a plurality of controls disposed in the cab 102.

Each of the first and second ground-engaging mechanisms 108, 110 can be further supported by a track frame 116 as shown in FIG. 1. The track frame 116 can oscillate about a pivot joint 120 to provide better traction for the crawler 100, particularly over uneven or rugged terrain. In a conventional pivot joint, a pivot shaft is provided between the main frame 106 and track frame 116. The conventional pivot shaft is lubricated and sealed in an oil bath. The shaft rotates 360° about a pivot axis and thereby functions like a pinned joint. Moreover, the pivot shaft is machined similar to a joint that can rotate 360°. During operation, the track frame 116 may oscillate or pivot about the pivot axis as the crawler moves along the ground. The conventional, sealed pivot shaft, however, can be overly expensive and the sealed connection can leak oil during use.

Figure 2:
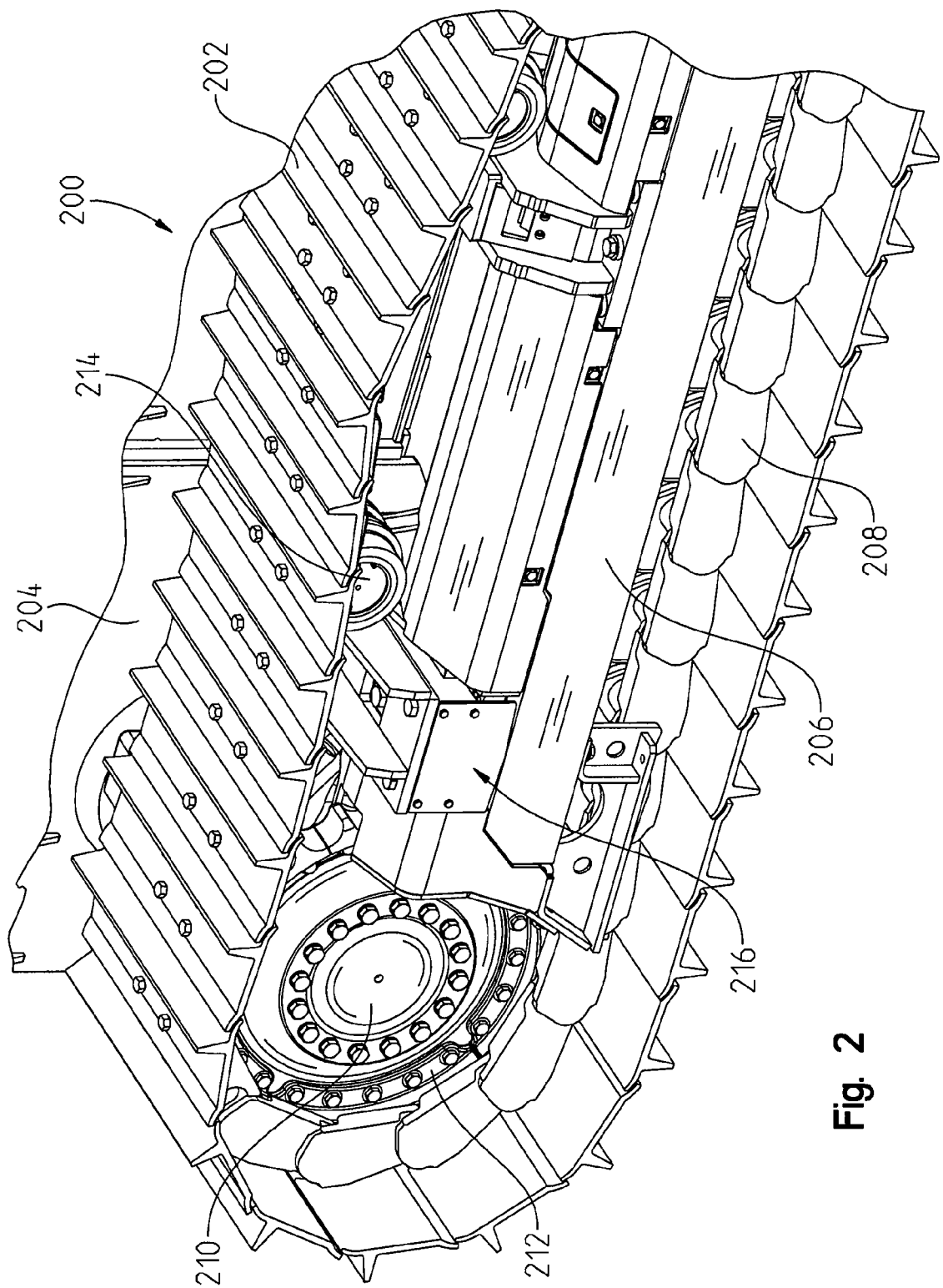
FIG. 2 is a partial side perspective view of a track frame and track assembly of a machine.

Referring to FIG. 2, a different pivot joint 216 is provided for a crawler 200. As shown, the crawler 200 includes a ground-engaging mechanism in the form of a track 202. The track 202 can be driven by a chain 208 and final drive assembly 210. The final drive assembly 210 can further drive a sprocket 212 at the rear portion of the crawler 200 to drive the track 202. As the chain 208 is driven by the final drive assembly 210, the chain 208 can pass over a series of rollers 214. The track 202 is supported by a track frame 206 as shown in FIG. 2. Moreover, the crawler 200 can include a main frame 204 that, in combination with the track frame 206, supports the pivot joint 216.

The pivot joint 216 of FIG. 2 is further shown in FIGS. 3-8. Unlike conventional pivot joints, the pivot joint 216 of FIGS. 2-8 does not include a pivot shaft, seals, or a need for lubrication. Instead, the pivot joint 216 is formed as a dry joint and can oscillate by at least 7° (i.e., approximately 3.5° in either direction about a pivot axis). In some aspect, the pivot joint 216 can oscillate by at least 10°. In any event, the pivot joint 216 is unable to pivot or rotate by 360° since there is no shaft as in the conventional joint.

Figure 3:
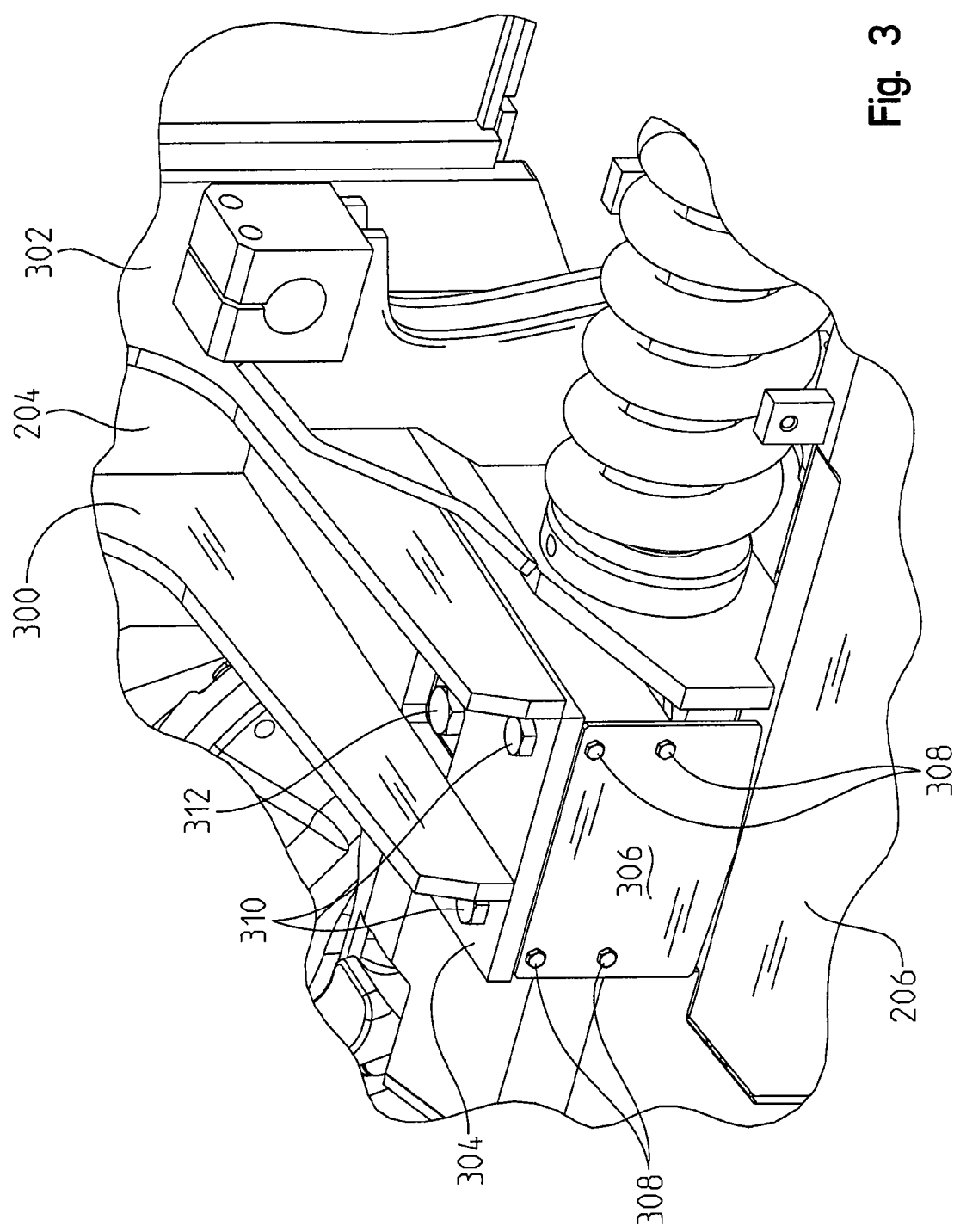
FIG. 3 is a partial perspective view of a dry joint of a track frame of the crawler of FIG. 2.

In FIG. 3, the pivot joint 216 can be protected or at least partially surrounding by a housing. The housing can be formed by a first rib 300 and a second rib 302 which are coupled to the main frame 204 of the crawler 200. The first rib 300 and second rib 302 can be welded, adhered, fastened or coupled in any other known manner. The ribs can carry loads from the track frame 206 and main frame 204. As such, the load-carrying ribs 300, 302 at least partially couple the pivot joint 216 to the main frame 204.

The housing can also include a first cover portion 304 and a second cover portion 306. The second cover portion 306 can be removably coupled to the pivot joint 216 via a plurality of fasteners. The second cover portion 306 can include a plurality of defined openings 308 through which the plurality of fasteners couple the second cover portion 306 to the pivot joint 216. Moreover, a plurality of fasteners 310 can further couple the first cover portion 304 to the pivot joint 216. Here, the first rib 300 and second rib 302 can be coupled, either integrally or otherwise, to the first cover portion 304 such that the first cover portion 304 is coupled to the main frame 204 of the crawler 200. Although not shown, the second cover portion 306 may be coupled to the track frame 204 in various embodiments. A different fastener 312 can support the pivot joint 216 with respect to the main frame 204 and track frame 206. This will be explained in greater detail with respect to FIG. 6.

Figure 4:
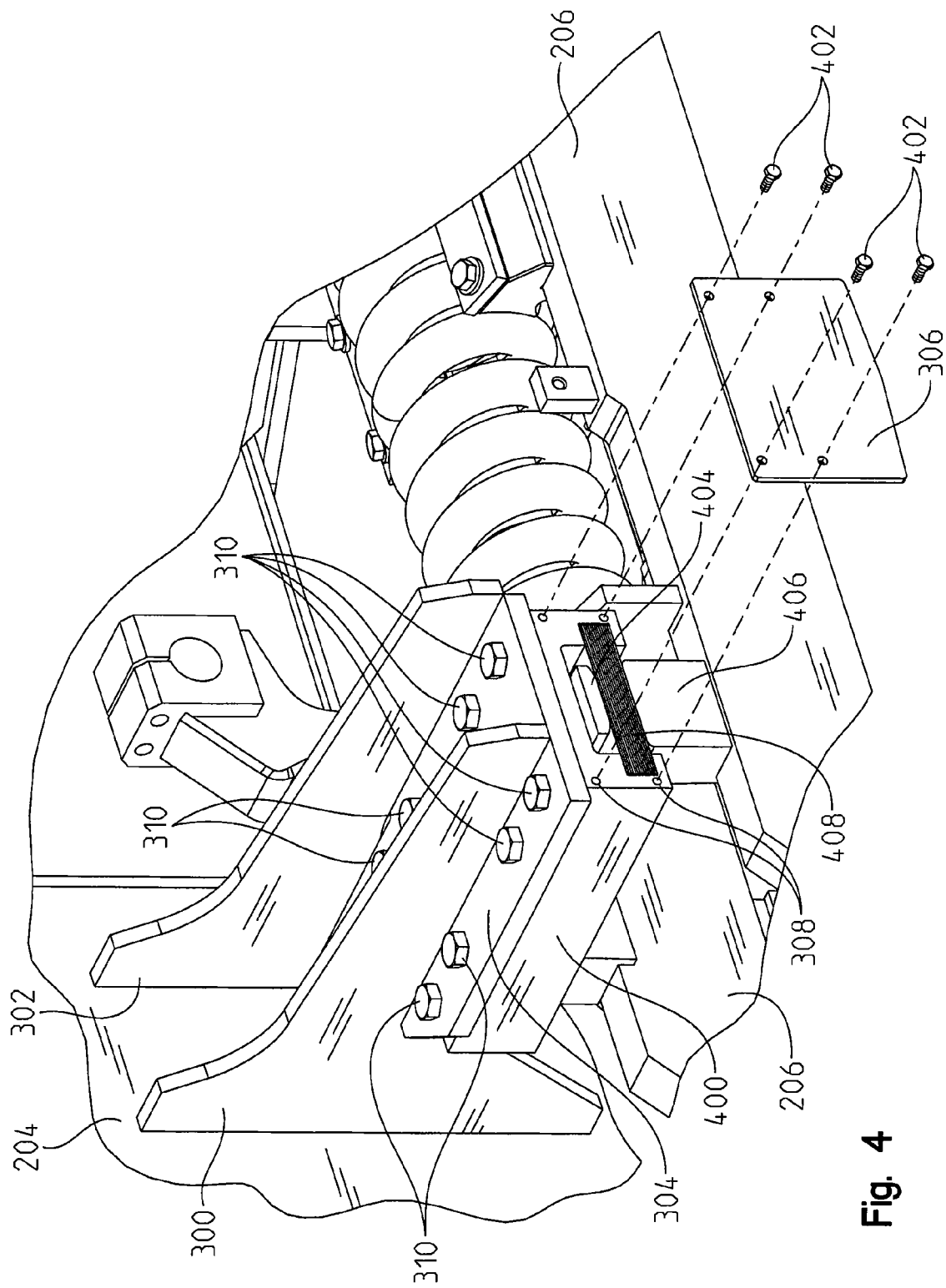
FIG. 4 is another partial perspective view of the dry joint of FIG. 3.

Referring to FIGS. 4-7, the different features and structure of the pivot joint 216 are shown in the illustrated embodiments. These features and structure may vary with other embodiments, and thus the present disclosure is not intended to be limited to the illustrated embodiments. In FIG. 4, the second cover portion 306 has been removed from the housing to further illustrate the features and structure of the pivot joint 216. In particular, the pivot joint 216 can include one or more plates 408. In one aspect, the one or more plates 408 can take the form of a plurality of shims 700 (see FIG. 7). In any event, the one or more plates 408 can be disposed on top of one another or stacked to achieve a desired thickness.

For purposes of this disclosure, the one or more plates 408 will refer to an assembly or laminated stack of plates or bodies. The assembly of plates or bodies will describe at least one plate or body and may include additional plates or bodies that form the overall assembly. It should be noted that in this disclosure, the assembly may only include one plate or body in one embodiment, where the one plate or body has a suitable thickness. In other embodiments, the assembly may include two or more plates or bodies. In addition, the assembly can be formed by one plate, body, or shim 700 as shown in FIG. 1 and described further below.

Each of the one or more plates 408 can be formed of a metal material such as, for example, stainless steel. In another example, the one or more plates 408 can be formed of any type of steel material. Alternatively, other type of metal materials may be used to form each plate 700 (see FIG. 7). The one or more plates 408 may be heat-treated. In one aspect, the one or more plates 408 are incorporated into the pivot joint 216 without being lubricated and without there being any source of lubrication during operation of the machine. In a different aspect, the one or more plates 408 may be pre-lubricated before being assembled into the pivot joint 216. In a further aspect, a source of lubrication may be provided to lubricate the one or more plates 408 during operation.

Figure 7:
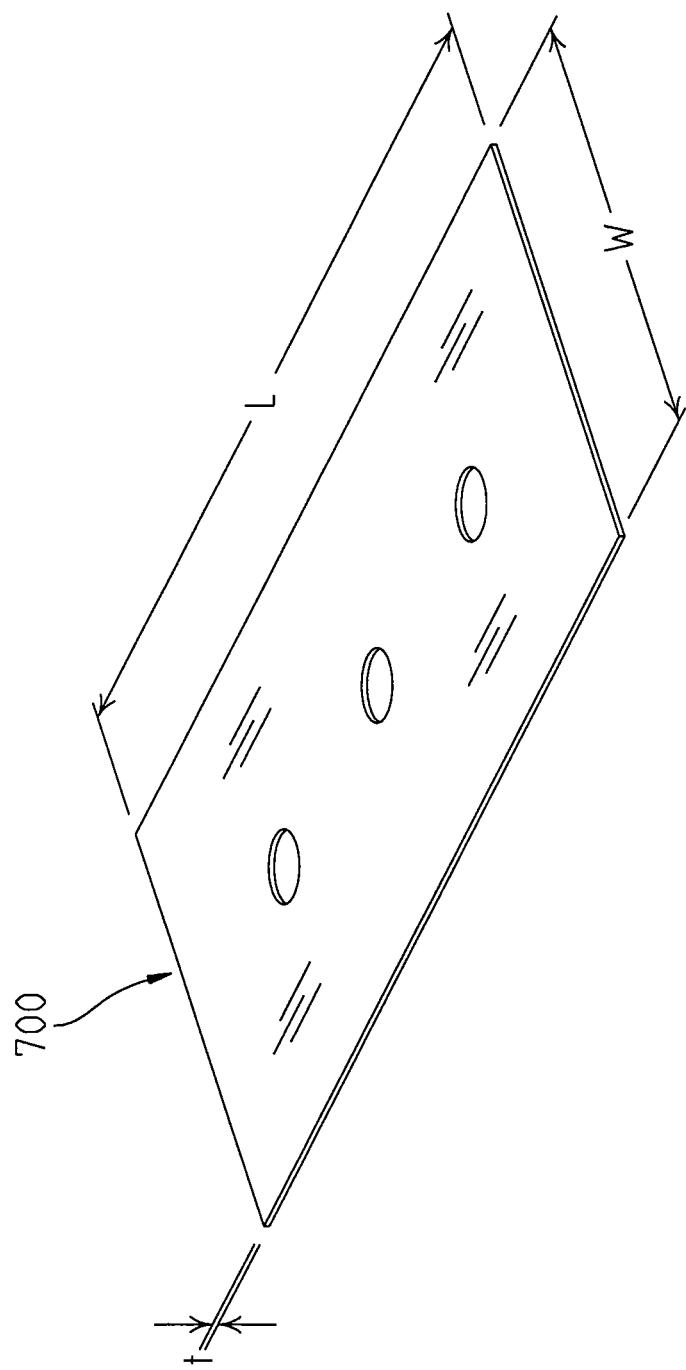
FIG. 7 is a perspective view of a shim.

Each of the one or more plates can be sized as appropriate based on the size of the pivot joint 216, which may be related to the type of machine. In FIG. 7, for example, the one or more plates 408 can include a plate 700 having a width "W" of approximately 175 mm and a length "L" of approximately 380 mm. In one embodiment, each plate 700 can have a thickness "t" of approximately 1 mm. In another embodiment, the thickness can be at least 1.5 mm. In other embodiments, the thickness of each plate 408 can vary relative to one another. In other embodiments, each of the one or more plates 408 can be spaced from one another by positioning a rubber body or plate therebetween. The rubber body (not shown) can have a similar size and thickness as each plate 700. The rubber body can include a plurality of rubber bodies, where one rubber body is disposed between a pair of plates 700. The inclusion of one or more rubber bodies may reduce the number of plates 700 in the pivot joint 216. The rubber body can be vulcanized or adhered inbetween each of the plurality of plates 700 that forms the assembly or stack of one or more plates 408. In any event, the one or more plates 408 (with or without the one or more rubber bodies) can form a laminated shim stack in at least one embodiment.

Figure 8:
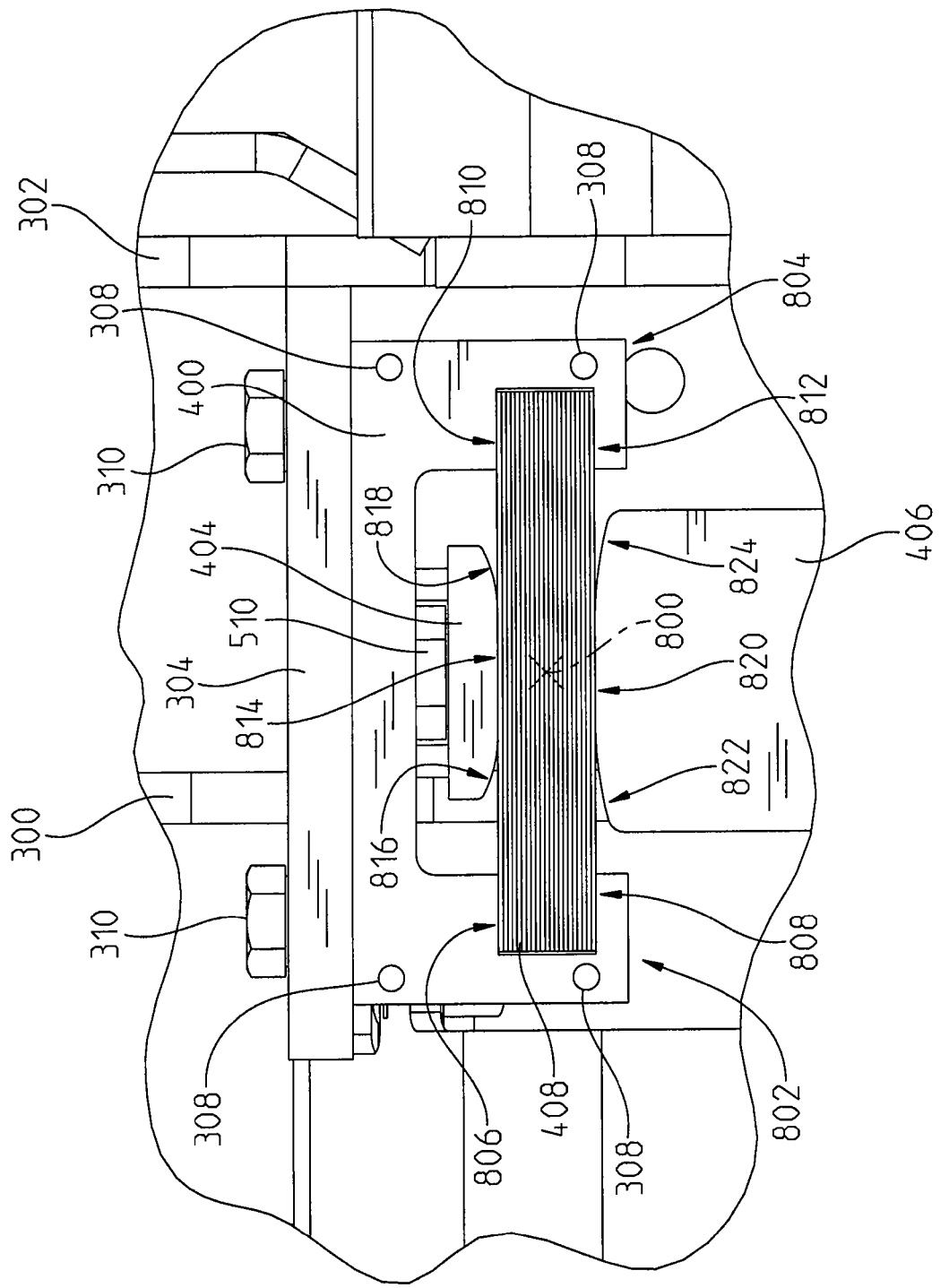
FIG. 8 is a cross-sectional view of a portion of the dry joint of FIG. 3.

To accommodate the oscillation of the track frame 206, the one or more plates 408 (and rubber body or bodies) can bend approximately 3.5° in a first direction and a second direction about a pivot axis 800 (see FIG. 8). In other words, the pivot shaft 216 is able to bend by approximately 7° total in at least one embodiment. The degree by which the pivot joint 216 can pivot can be less or greater than 7° depending on the type of machine, and 7° is only provided as an example of one embodiment. In a different example, the pivot shaft 216 can pivot by at least 10°. The one or more plates 408, both alone and in combination as a laminated shim stack, can be elastically-bent such that each plate 408 is not substantially deformed as the track frame 206 oscillates. In this manner, the pivot joint 216 can maintain its flexibility and pivot in both the first and second directions about the pivot axis 800 by approximately the same degree. In other words, after repeated oscillation or pivotal movement, the pivot joint 216 can maintain its integrity and pivot about the pivot axis in both directions by about the same degree. In the event the pivot joint begins to lose its ability to pivot through its intended range of motion, the pivot joint can be easily removed and replaced with a new one or more plates 408 by removing the second cover portion 306 from the housing.

Figure 5:
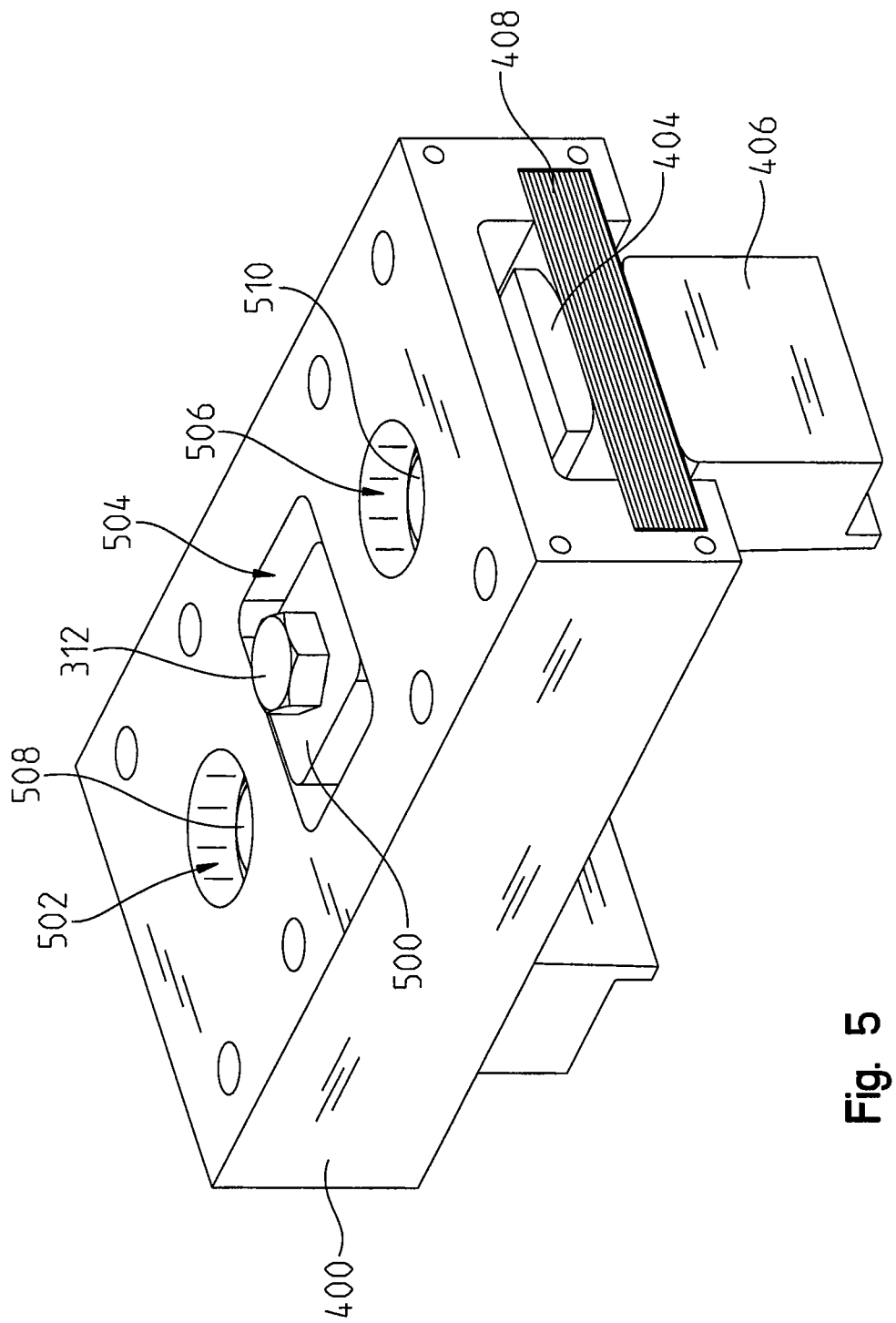
FIG. 5 is a perspective view of a handle, upper body, lower body, and plurality of shims of the dry joint of FIG. 3.

The pivot joint 216 can also include a plate holder 400 for holding the one or more plates 408. The plate holder 400 can be coupled to the main frame 204 via welding or fasteners. Moreover, as shown in FIG. 5, the plate holder 400 can include an upper surface with a plurality of defined openings for receiving bolts 310 or other fasteners. The bolts 310 or other fasteners can couple and secure the plate holder 400 to the first cover portion 304 of the housing. While eight bolts 310 are shown in FIG. 5, any number of fasteners may be used for securing the plate holder 400 to the first cover portion 304.

The plate holder 400 can also include other defined openings in its upper surface. For instance, a first opening 502 and a second opening 506 are shown defined in its upper surface through which a first fastener 508 and a second fastener 510, respectively, can be accommodated. As will be described, the first fastener 508 and second fastener 510 can couple and secure the one or more plates 408 to an upper body 404 and a lower body 406. Moreover, the first and second fasteners further couple the one or more plates 408 to the main frame 304 and track frame 306.

A third opening 504 is defined in the upper surface of the plate holder 400 to accommodate a key 500 and corresponding fastener 312. The key 500 is further described below. In the illustrated embodiment, the first and second openings are defined as circular openings, whereas the third opening 504 is defined as a square or rectangular opening. These openings can be defined as any shape, and in particular, the first and second openings may be defined based on the size and shape of the first and second fastener and the third opening may be defined based on the size and shape of the key 500.

A front face of the plate holder 400 can include a plurality of openings defined therein for receiving a plurality of fasteners 402, as shown in FIGS. 4 and 5. The plurality of fasteners can couple and secure the second cover portion 306 to the front face of the plate holder 400. In this manner, the pivot joint 216 is easily accessible for any desired maintenance and service.

Referring to FIGS. 5 and 8, the plate holder 400 forms a structure capable of holding the one or more plates 408 in a "stack-like" manner. To do so, the plate holder 400 can include a first leg 802 and a second leg 804, where the first leg 802 is on one side of the holder 400 and the second leg 804 is on an opposite side thereof. The first leg 802 and second leg 804 have a defined recess therein. The defined recess in the first leg 802 includes a first surface 806 and a second surface 808. The defined recess in the second leg 804 includes a first surface 810 and a second surface 812. In this arrangement, the defined recess in each of the first leg 802 and second leg 804 can be aligned with one another to form a slot for receiving the one or more plates 408. The spacing between the first surface 806 and second surface 808 of the first leg 802 can be substantially the same as the spacing between the first surface 810 and second surface 812 of the second leg 804. Therefore, the one or more plates 408 can be stacked on top of one another, with or without the one or more aforementioned rubber bodies therebetween, to form part of the pivot joint 216.

Figure 6:
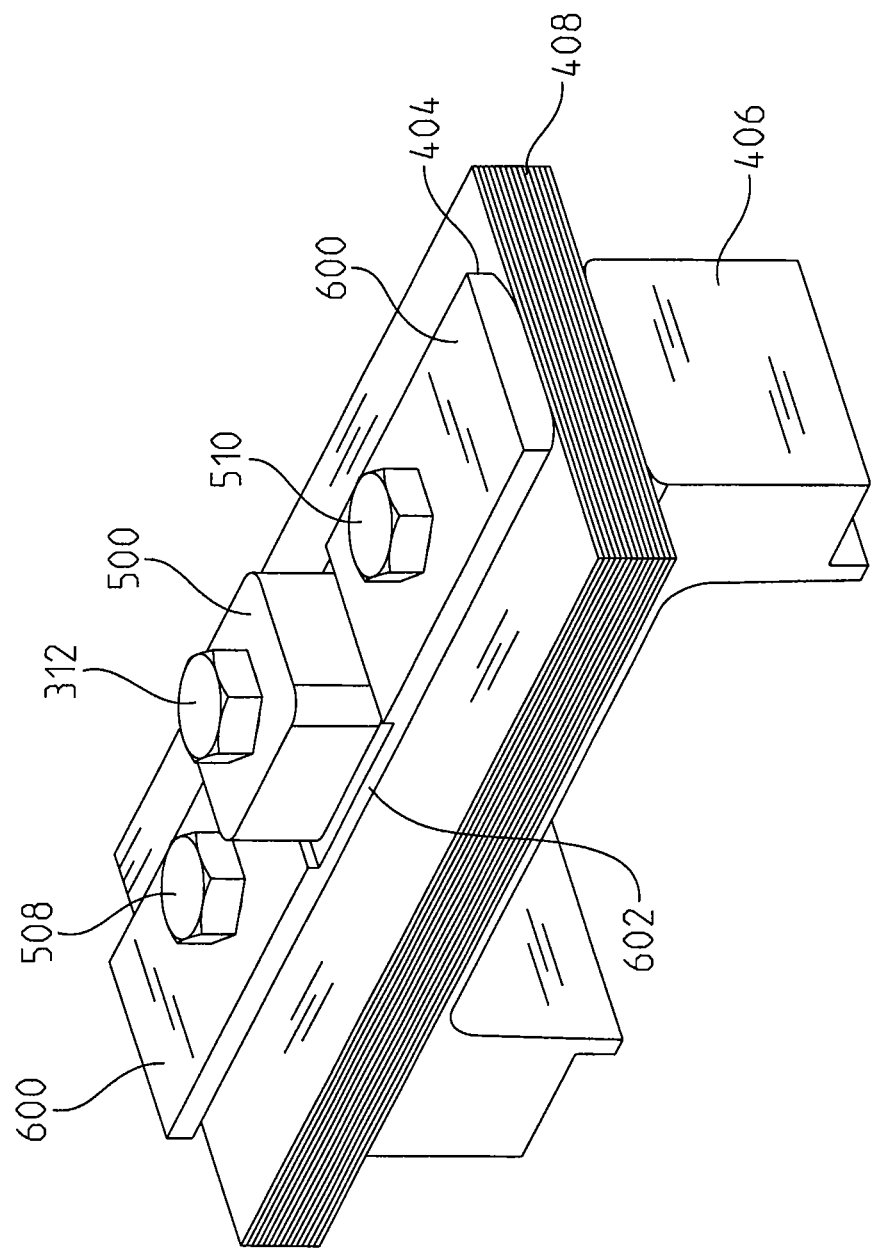
FIG. 6 is another perspective view of the upper body, lower body, and plurality of shims of FIG. 5.

Referring to FIG. 5, the key 500 is shown as a block-like body. The key 500 is disposed in the slot 504 defined in the plate holder 400. As shown in FIG. 6, the key 500 can be further positioned within a recess 604 defined in the upper body 404. In this arrangement, the fastener 312 couples the key 500 to the upper body 404 and the plate holder 400 and further passes through a defined opening 704 in each plate 700 of the one or more plates 408. This maintains the pivot joint 216 as an assembly and keeps the one or more plates 408 from moving laterally relative to one another, the main frame 204 and the track frame 206. Moreover, the key 500 and fastener 312 couples the one or more plates 408 to the main frame 204 during operation.

In FIGS. 4-6 and 8, the pivot joint 216 can include another structure in the form of the upper body 404 and lower body 406. The upper body 404 and lower body 406 can be integrally coupled to one another to form a single body, or alternatively the upper body 404 and lower body 406 can be coupled to one another via the first fastener 508 and the second fastener 510. To accommodate this latter embodiment, each plate 700 can include a plurality of defined openings (see FIG. 7) including a first defined opening 702 and a second defined opening 706. The first fastener 508 can therefore couple the upper body 404, lower body 406, and each plate by passing through the first opening 702 in each plate 700. Similarly, the second fastener 510 can coupled the upper body 404, lower body 406, and each plate 700 by passing through the second opening 706 in each plate 700. As shown in the illustrated embodiments of this disclosure, each plate 700 can be stacked on top of another plate 700 to form the one or more plates 408. The one or more plates 408 can form a stack or laminated pack of plates or shims.

The upper body 404 and lower body 406 are coupled to the track frame 206. In one aspect, the upper body 404 and lower body 406 can be welded to the track frame 206. In other aspects, the upper body 404 and lower body 406 can be fastened, adhered, or coupled to the track frame 206 in other known ways. As the upper body 404 and lower body 406 are coupled to the track frame 206, the combined structure of the upper body 404 and lower body 406 can form a substantially C-like structure. In this manner, the stack or laminated pack of plates 408 can be disposed between the upper body 404 and lower body 406 and allow the track frame 206 to oscillate thereabout.

As shown in FIG. 8, the upper body 404 and lower body 406 can include curved surfaces that are in contact with the one or more plates 408. In particular, the upper body 404 can include a first curved surface 816 and a second curved surface 818 with a substantially flat surface 814 disposed therebetween. Likewise, the lower body 406 can include a first curved surface 822 and a second curved surface 824 with a substantially flat surface 820 disposed therebetween. These curved surfaces can reduce the stress imposed on each of the plates 700 as the track frame 206 oscillates about the pivot joint 216. Moreover, as the track frame 206 oscillates or pivots about the joint 216, the upper body 404 and lower body 406 can pivot in a concomitant relationship to that of the frame 206 relative to the one or more plates 408.

As described above, the one or more plates 408 may be elastic such that each plate 700 can bend as the track frame 206 oscillates. Alternatively, as the track frame 206 oscillates, the upper body 404 and lower body 406 can pivot as each curved surface comes into contact with the uppermost and lowermost plate 700 in the one or more plates 408, respectively. In this manner, the one or more plates 408 may be rigidly formed such that there is no bend as the track frame 206 oscillates. In a further embodiment, a combination of the aforementioned embodiments is possible where the one or more plates 408 can be elastic and bend and the upper and lower bodies pivot about the one or more plates 408.

In FIG. 8, the pivot axis 800 can be longitudinally defined approximately halfway between the substantially flat surface 814 of the upper body 404 and the substantially flat surface 820 of the lower body 406. Moreover, the axis 800 can be defined approximately in the middle of the one or more plates 408.

Each of the one or more plates 408 can have a width that is greater than the width of each of the upper body 404 and lower body 406. This width may be twice the width of the upper and lower bodies. The upper body can further include a thickness less than 1", and in one aspect the thickness is approximately 0.75". The lower body can include a thickness of at least 4" and in some embodiments somewhere between approximately 4-5". In other embodiments, the lower body 406 may have a thickness slightly less than 4".

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A pivot joint about which a track frame pivots relative to a main frame of a crawler, comprising:
   a housing configured to be coupled to the main frame, the housing including a first cover portion, a second cover portion, and at least one load-bearing rib configured to be coupled to the main frame;
   a holder configured to be coupled to the main frame, the holder including a first leg and a second leg;
   an upper body and a lower body coupled to one another, the upper body and lower body adapted to be coupled to the track frame; and
   a plurality of plates stacked on top of one another, the plurality of plates being positioned between the first leg and second leg of the holder and between the upper body and lower body;
   wherein, the plurality of plates defines a pivot axis of the pivot joint.

2. The pivot joint of claim 1, wherein the first leg and second leg each define a slot in which the plurality of plates is disposed.

3. The pivot joint of claim 1, wherein the arrangement of the plurality of plates forms a defined thickness and a pivot axis is defined at approximately a center of the thickness.

4. The pivot joint of claim 1, wherein the first cover portion is coupled to the holder and the second cover portion is removably coupled to the holder.

5. The pivot joint of claim 1, wherein:
a bottom side of the upper body includes a first curved surface, a second curved surface, and a substantially flat surface therebetween; and
a top side of the lower body includes a first curved surface, a second curved surface, and a substantially flat surface therebetween, where both of the substantially flat surfaces are oriented towards one another;
further wherein, during a pivotal movement about the pivot joint, the upper and lower bodies pivot relative to the plurality of plates such that the plurality of plates come into contact with the first curved surface, second curved surface, and substantially flat surface of both the upper body and lower body.

6. The pivot joint of claim 1, wherein the upper body includes a first portion having a first thickness, a second portion having a second thickness, and a third portion have a third thickness, the first and third thicknesses are about the same and the second thickness is less than the first and third thicknesses;
further wherein, the second portion is positioned between the first and third portions.

7. The pivot joint of claim 6, further comprising a key disposed within the second portion of the upper body, the key being coupled to the upper body, lower body, and the plurality of plates.

8. The pivot joint of claim 1, wherein the plurality of plates comprises at least one rubber plate.

9. A machine, comprising:
a main frame configured to support the machine;
a track frame coupled to the main frame;
a ground-engaging mechanism supported by the track frame;
a holder coupled to the main frame, the holder including a first leg and a second leg; and
a pivot joint defining a pivot axis about which the track frame pivots, the pivot joint including a plurality of plates each of which is arranged on top of one another, wherein the plurality of plates includes at least one rubber plate;
wherein, during a pivotal movement, the track frame pivots relative to the plurality of plates;
further wherein, the first leg and second leg each define a slot in which the plurality of plates are disposed.

10. The machine of claim 9, wherein the plurality of plates comprises a plurality of metal plates and a plurality of rubber plates;
further wherein, at least one of the plurality of rubber plates is positioned in contact with at least one of the plurality of metal plates.

11. The machine of claim 10, further comprising a housing coupled to the main frame, the housing including a first cover portion coupled to the main frame and holder, a second cover portion removably coupled to the holder, and at least one load-bearing rib coupled to the main frame.

12. The machine of claim 11, wherein, in the coupled position, the first cover portion and second cover portion at least partially enclose the plurality of plates.

13. The machine of claim 9, further comprising an upper body and a lower body coupled to one another and the track frame, wherein the plurality of plates are positioned therebetween.

14. The machine of claim 13, wherein the upper body includes a first portion having a first thickness and a second portion having a second thickness, the first thickness being greater than the second thickness.

15. The machine of claim 14, further comprising a key disposed within the second portion of the upper body, the key being coupled to the upper body, lower body, and the plurality of plates.

16. The machine of claim 13, wherein:
a bottom side of the upper body includes a first curved surface, a second curved surface, and a substantially flat surface therebetween; and
a top side of the lower body includes a first curved surface, a second curved surface, and a substantially flat surface therebetween, where both of the substantially flat surfaces are oriented towards one another;
further wherein, as the track frame pivots about the pivot axis, the upper and lower bodies pivot relative to the plurality of plates such that the plurality of plates come into contact with the first curved surface, second curved surface, and substantially flat surface of both the upper body and lower body.

17. The machine of claim 9, wherein the track frame is structured to pivot no more than about 10° relative to the main frame.

18. A work machine, comprising:
a cab;
a first frame to support the cab;
a second frame coupled to the first frame;
a ground-engaging mechanism supported by the second frame; and
a pivot joint defining a pivot axis about which the second frame pivots relative to the first frame,
wherein the pivot joint comprises:
a housing configured to be coupled to the first frame, the housing including a first cover portion, a second cover portion, and at least one load-bearing rib coupled to the first frame;
a holder coupled to the first frame, the holder including a first leg and a second leg;
an upper body and a lower body coupled to one another, the upper body and lower body further coupled to the second frame; and
a plurality of plates stacked on top of one another, the plurality of plates being positioned between the first leg and second leg of the holder and between the upper body and lower body;
further wherein, during a pivotal movement, the second frame pivots relative to the plurality of plates.

19. The work machine of claim 18, wherein:
a bottom side of the upper body includes a first curved surface, a second curved surface, and a substantially flat surface therebetween; and
a top side of the lower body includes a first curved surface, a second curved surface, and a substantially flat surface therebetween, where both of the substantially flat surfaces are oriented towards one another;
further wherein, as the second frame pivots about the pivot axis, the upper and lower bodies pivot relative to the plurality of plates such that the plurality of plates come into contact with the first curved surface, second curved surface, and substantially flat surface of both the upper body and lower body.

* * * * *